United States Patent

Kawazu et al.

[11] 3,764,607
[45] Oct. 9, 1973

[54] 3-PIPERIDYLIDENE METHANE DERIVATIVES

[75] Inventors: Mitsutaka Kawazu; Takeshi Kanno; Seiichi Saito; Hajime Tamaki, all of Saitama, Japan

[73] Assignee: Tanabe Seiyaku Co., Ltd., Osaka, Japan

[22] Filed: June 3, 1971

[21] Appl. No.: 149,849

[30] Foreign Application Priority Data
June 11, 1970 Japan................................ 45/50540

[52] U.S. Cl............................ 260/293.68, 424/267
[51] Int. Cl............................................ C07d 99/06
[58] Field of Search................................ 260/293.68

[56] References Cited
UNITED STATES PATENTS
2,739,968  3/1956  Sperber et al. ..................... 260/293
3,145,212  8/1964  Yamamoto et al. .............. 260/293.4

OTHER PUBLICATIONS
Sugimoto et al., Chem. and Pharm. Bull. 8, 745–748 (1960).

Primary Examiner—Henry R. Jiles
Assistant Examiner—G. Thomas Todd
Attorney—Harry C. Bierman and Jordan B. Bierman

[57] ABSTRACT

Di-(2-thienyl)-(N-methyl-5-methoxy-3-piperidyl)-carbinol is dehydrated. Di-(2-thienyl)-(N-methyl-5-methoxy-3-piperidylidine-methane is produced. The resultant di-(2-thienyl)-(N-methyl-5-methoxy-3-piperidylidene)-methane is reacted with a compound of the formula R-X, wherein R is lower alkyl and X is an anionic residue of a pharmaceutically acceptable acid. A compound having the formula

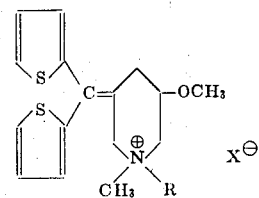

wherein X and R are as defined above, is produced. This compound is a potent antispasmodic.

7 Claims, No Drawings

3-PIPERIDYLIDENE METHANE DERIVATIVES

This invention relates to novel derivatives of di-(2-thienyl)-(N-methyl-5-methoxy-3-piperidylidene)-methane and to a process for preparing same.

The derivatives are represented by the formula:

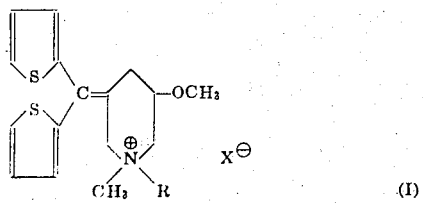

wherein R represents a lower alkyl radical, X represents an anionic residue of a pharmaceutically acceptable acid.

We have now found that the quarternary ammonium compound (I) of the present invention has a potent antispasmodic activity. The parasympathetic blocking activity of the compound of the present invention is comparable or superior to that of atropine sulfate. For instance, di-(2-thienyl)-(N-methyl-5-methoxy-3-piperidylidene)-methane methylbromide exhibits an inhibitory activity about three times greater than that of atropine sulfate on gastric contractions induced by electrical stimulation of the cervical vagus nerve in rats. The inhibitory activity ($ED_{50}$) of the compound which would suppress 50 percent of said stimulation-induced gastric contractions was 10 μg/kg, when the stimulation for the distal end of the cervical vagus nerve of rat was carried out every 2 minutes at the rate of supramaximal square waves (about 1.5 V, 10 cycles/second) 1 minute after injecting a test compound into the femoral vein. In contrast thereto, the $ED_{50}$ of atropine sulfate showed 30 μg/kg under the same conditions as above. Moreover, when examined using isolated guinea pig ileum, the anti-cholinergic activity ($pA_2$) of the compound was 8.37. In contrast thereto, atropine sulfate showed 8.57. ($pA_2$ was the value of negative logarism of the molar concentration of a test compound which caused the shift of log.2 to high concentration in the dose response curve of methacholine)

It is well known that the parasympatholytics show unfavorable side effects such as mydriatic and anti-sialogogue activity. Such side effects of the compound of the present invention are relatively less as compared with parasympatholytic agents of the prior art. For instance, the mydriatic and anti-sialogogue activity of di-(2-thienyl)-(N-methyl-5-methoxy-3-piperidylidene)-methane methylbromide is about 1/10 to 1/20 times that of atropine sulfate. The compound of the present invention has almost no central anti-cholinergic activity.

Additionally, the toxicity of the compound of the present invention is relatively low. For instance, when administered orally, the acute toxicity ($LD_{50}$) of di-(2-thienyl)-(N-methyl-5-methoxy-3-piperidylidene)-methane methylbromide is more than 700 mg/kg.

According to the present invention, a compound of the formula (I) can be prepared by reacting 2-thienyl magnesium halide or 2-thienyl lithium (II) with N-methyl-5-methoxy-nipecotinic acid ester of the formula:

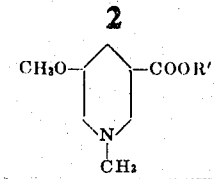

wherein R' represents an ester residue, subjecting the resultant carbinol derivative (IV) to the dehydration reaction and reacting the thus obtained piperidylidene compound (V) with a compound of the formula: RX (VI), wherein R and X have the same meaning as defined above.

The above mentioned reactions are shown in U.S. Pat. Nos. 2,739,968 and 2,739,969 for similar compounds and can be represented by the following schemes;

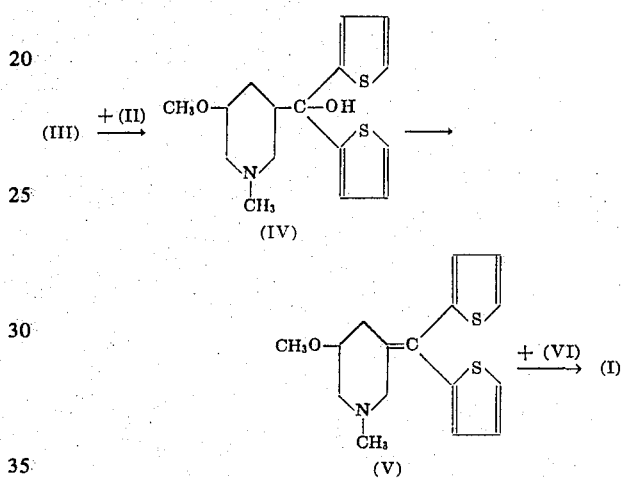

The starting compound (III) is readily obtained. For instance, an alkyl ester of N-methyl-5-methoxy-nipecotinate may be prepared by refluxing 5-bromo-nicotinic acid with a mixture of sodium hydroxide, copper sulfate and copper powder, treating the thus obtained 5-hydroxy-nicotinic acid with a dialkyl sulfate in nitrogen atmosphere, and then subjecting the resultant N-alkyl-piperidine derivative to catalytic reduction in the presence of Raney-nickel.

Preferred examples of the starting compound (VI) are a lower alkyl halide (e.g., methyl iodide, methyl bromide, methyl chloride, ethyl iodide, ethyl bromide, ethyl chloride), a lower alkyl ester of alkanesulfonic acid (e.g., methyl methanesulfonate, methyl ethanesulfonate, ethyl ethanesulfonate), a lower alkyl ester of aromatic sulfonic acid (e.g., methyl p-toluenesulfonate, methyl benzenesulfonate, ethyl p-toluenesulfonate, ethyl benzenesulfonate), and di-lower alkylsulfate (e.g., dimethyl sulfate, diethylsulfate). The ester residue (R') includes a lower alkyl radical (e.g., methyl, ethyl, propyl radical).

The preparation of the carbinol derivative (IV) can be carried out by mixing the compounds (II) and (III) at room temperature or under refluxing in an inert solvent. Ether, tetrahydrofuran, benzene etc., are suitable as the reaction solvent.

The subsequent dehydration reaction may be accomplished by heating the compound (IV) at about 60° to 80° C in the presence of diluted mineral acid (e.g., diluted hydrochloric acid, diluted sulfuric acid). Alternatively, the reaction may be carried out by refluxing the compound (IV) with an inert solvent (e.g., benzene, toluene) in the presence of arylsulfonic acid (e.g., toluenesulfonic acid, benzenesulfonic acid).

The quarternary ammonium compound (I) may be prepared by conventional manner. For instance, it is readily obtained by mixing the compounds (V) and (VI) in an inert solvent (e.g., benzene, acetone, ether) at room temperature. When methyl ester of alkanesulfonic acid or methyl ester of aromatic sulfonic acid is employed as the compound (VI), it is preferred to carry out the reaction in the presence of a catalyst such as alkali metal iodide (e.g., potassium iodide, sodium iodide).

The compound (I) thus obtained is useful as an spasmodic agents. This compound is also useful for the treatment and/or prevention of gastric ulcers, and for the control of gastric secretion. The compound may be used in the form of a pharmaceutical preparation for enteral or parenteral administration at a daily dose of 0.05 to 50 mg/kg.

Practical and presently-preferred embodiments of the present invention are illustratively shown in the following Examples.

Example 1

50 g of 5-bromonicotinic acid are added to a solution containing 50 g of sodium hydroxide, 15 g of copper sulfate 5 hydrate, 2 g of copper powder and 400 ml of water. The mixture is refluxed for 20 hours under stirring and then cooled. Hydrogen sulfide gas is introduced into the mixture. Then, the mixture is decolorized with activated carbon and filtered. The filtrate is adjusted to pH 3 - 4 with hydrochloric acid. The precipitated crystals are collected by filtration. Recrystallization of the crystals from methanol gives 30 g of 5-hydroxynicotinic acid. M.P. 298° - 299° C (decomp.)

120 g of 5-hydroxynicotinic acid are dissolved in one liter of methanol. After saturating with dry-hydrogen chloride gas at 0° C, the solution is refluxed for 2 hours. Then, the solution is concentrated to dryness. The residue thus obtained is dissolved in water. The solution is alkalified with sodium bicarbonate. The precipitated crystals are collected by filtration, washed with water and then dried. 126 g of methyl 5-hydroxy-nicotinate are obtained. Yield; 93 % M.P. 184° - 186° C 460 g of methyl 5-hydroxynicotinate and 621 g of potassium carbonate are suspended in 200 ml of tetrahydrofuran-methanol (4:1). 1,134 g of dimethylsulfate are added dropwise to the suspension in nitrogen atmosphere at room temperature. The mixture is stirred overnight at the same temperature and then filtered. The filtrate is concentrated to dryness. The residue thus obtained is mixed with 1.6 liters of methanol and 280 ml of Raney-nickel, and hydrogenated overnight in an autoclave at room temperature and at a pressure of 85 atmospheres. 200 g of Raney-nickel are added to the reaction mixture. The mixture is adjusted to pH 9.5 with triethylamine, and is further subjected to hydrogenation for 20 hours in an autoclave at 70° C and at a pressure of 100 atmospheres. Potassium carbonate and a small amount of ice are added to the reaction mixture to bring the pH to 11. The mixture is extracted with ether. After drying, the ether layer is filtered. The filtrate is evaporated to remove ether. The residue thus obtained is distilled under reduced pressure. 450 g of methyl N-methyl-5-methoxy-nipecotinate are obtained. Yield: 80 % B.p. 80° - 81° C/0.5 mmHg.

A solution of 18 g of 2-thienyl bromide in 30 ml of tetrahydrofuran is gradually added to a mixture of 2.6 g of magnesium and 80 ml of tetrahydrofuran under stirring at 50° C. The mixture is stirred for 5 hours at room temperature until the magnesium is entirely dissolved in the solution. 6.2 g of methyl N-methyl-5-methoxy-nipecotinate are added to the mixture. Then, the mixture is refluxed for 4 hours. After the reaction is completed, tetrahydrofuran is distilled off under reduced pressure. An aqueous ammonium chloride solution is added to the residue, and the solution is extractd with chloroform. The extract is dried and then evaporated to remove chloroform. The viscous oil thus obtained is recrystallized from a mixture of benzene and ether. 7 g of di-(2-thienyl)-(N-methyl-5-methoxy-3-piperidyl)-carbinol are obtained as crystals. M.p. 142° - 146° C.

7 g of the product are dissolved in 150 ml of 10 % hydrochloric acid, and the solution is heated at 80° C for 30 minutes. After the reaction is completed, the solution is alkalified with sodium hydroxide and then extracted with ether. The extract is washed with water, dried and evaporated to remove ether. 5 g of di-(2-thienyl)-(N-methyl-5-methoxy-3-piperidylidene)-methane are obtained as pale yellow oil.

Infrared absorption spectrum:
$\nu_{max}^{liquid}$ cm$^{-1}$: 1,460, 1,440, 1,360, 1,105, 855, 705
N.M.R. (60 mc) (in CDCl$_3$):
2.75(m, 3H), 3.05(m, 3H), 6.67(s, 3H), 7.71(s, 3H)

365 mg of di-(2-thienyl)-(N-methyl-5-methoxy-3-piperidylidene)-methane are dissolved in 15 ml of ether. One ml of methyl bromide is added to the solution. Then, the solution is stirred overnight. The precipitated crystals are collected by filtration and recrystallized from a mixture of acetone and ether. 390 mg of di-(2-thienyl)-(N-methyl-5-methoxy-3-piperidylidene)-methane methylbromide are obtained as colorless crystals. M.p. 198° - 200° C.

Infrared absorption spectrum:
$\nu_{max}^{Nujol}$ cm$^{-1}$: 1,460, 1,378, 1,100, 834, 800, 715, 700

Example 2

A solution of 2-thienyl lithium in 200 ml of ether is prepared from 1.4 g of metal lithium and 18 g of 2-thienyl bromide by conventional manner. 4 g of methyl N-methyl-5-methoxy-nipecotinate are added dropwise to the solution. The solution is refluxed for 8 hours and then allowed to stand at room temperature. The solution is evaporated to remove ether. Ice-water is added to the residue, and the mixture is extracted with chloroform. The extract is dried and then evaporated to remove chloroform. The viscous oil thus obtained is recrystallized from a mixture of benzene and ether. 5 g of di-(2-thienyl)-(N-methyl-5-methoxy-3-piperidyl)-carbinol are obtained. M.p. 140° - 145° C.

75 g of the product are dissolved in 230 ml of 10 % hydrochloric acid, and the solution is heated at 70° - 80° C for 2 hours. After cooling, the solution is alkalified with sodium hydroxide to pH 9.0 and then extracted with benzene. The extract is dried and evaporated to remove benzene. The residue thus obtained is purified by distillation and then suspended in ether. The precipitated crystals are collected by filtration. 64 g of di-(2-thienyl) -(N-methyl-5-methoxy-3-piperidylidene)-methane are obtained as colorless crystals. M.p. 70° - 71° C.

500 mg of di-(2-thienyl)-(N-methyl-5-methoxy-3-piperidylidene)-methane are dissolved in 10 ml of acetone. A solution of 1.25 g of ethyl iodide in 10 ml of acetone is added to the solution under stirring at room temperature, and the mixture is stirred overnight. Then, the mixture is evaporated to remove solvent. The residue thus obtained is recrystallized from a mixture of acetone, methanol and isopropanol. 650 mg of di-(2-thienyl)-(N-methyl-5-methoxy-3-piperidylidene)-methane ethyl iodide are obtained as pale yellow crystals. Recrystallization of the crystals gives colorless granular crystals. M.p. 201° – 202° C.

Infrared absorption spectrum:
$\nu_{max}^{Nujol}$ cm$^{-1}$: 1,460, 1,450, 1,370, 1,093, 1,065, 1,013, 828, 750, 700

What we claim is:

1. A compound represented by the formula:

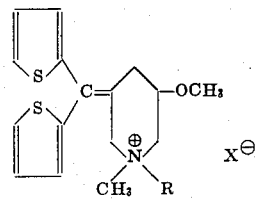

wherein R is a lower alkyl and X is an anionic residue of a pharmaceutically acceptable acid.

2. Di-(2-thienyl)-(N-methyl-5-methoxy-3-piperidylidene)-methane.

3. The compound as claimed in claim 1, wherein R is methyl.

4. The compound as claimed in claim 1, wherein R is ethyl.

5. The compound as claimed in claim 1, wherein X is a halide, p-toluenesulfonate, benzenesulfonate, methylsulfonate or ethylsulfonate ion.

6. The compound as claimed in claim 1, wherein X is a halide ion.

7. The compound as claimed in claim 1, wherein X is a chloride, bromide or iodide ion.

* * * * *